United States Patent
Kuchnio et al.

(10) Patent No.: US 10,250,809 B2
(45) Date of Patent: Apr. 2, 2019

(54) VIDEO STABILIZATION SYSTEM AND METHOD

(71) Applicant: SYNAPTIVE MEDICAL (BARBADOS) INC., Bridgetown (BB)

(72) Inventors: Piotr Kuchnio, Burlington (CA); Sam Anthony Leitch, Waterdown (CA); Christopher Thomas Jamieson, Mississauga (CA); Guillaume Dumont, Quebec (CA); Claude Chevalier, Quebec (CA); Louis St-Laurent, Quebec (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 60 days.

(21) Appl. No.: 15/545,017

(22) PCT Filed: Feb. 24, 2017

(86) PCT No.: PCT/CA2017/000036
§ 371 (c)(1),
(2) Date: Jul. 20, 2017

(87) PCT Pub. No.: WO2018/152609
PCT Pub. Date: Aug. 30, 2018

(65) Prior Publication Data
US 2018/0359420 A1    Dec. 13, 2018

(51) Int. Cl.
*H04N 5/232*    (2006.01)
*G06T 7/246*    (2017.01)

(52) U.S. Cl.
CPC ......... *H04N 5/23267* (2013.01); *G06T 7/248* (2017.01); *H04N 5/23254* (2013.01);
(Continued)

(58) Field of Classification Search
CPC ........... H04N 5/23267; H04N 5/23254; G06T 7/248; G06T 2207/20021; G06T 2207/20024; G06T 2207/10016
See application file for complete search history.

(56) References Cited

U.S. PATENT DOCUMENTS 8,102,428 B2 *  1/2012  Agarwala .......... H04N 5/23267
                                                   348/208.3
9,277,129 B2 *  3/2016  Klivington ......... H04N 5/23267
(Continued)

FOREIGN PATENT DOCUMENTS

CN        101238714 A      8/2008

OTHER PUBLICATIONS

OPenCV, "Video Stablization," http://docs.opencv.org/trunk/d5/d50/group_videostab.html, generated on Tue Jul. 18, 2017 22:28:09 by doxygen 1.8.12, pp. 1-3.
(Continued)

Primary Examiner — Christopher K Peterson
(74) Attorney, Agent, or Firm — Kagan Binder, PLLC (57) ABSTRACT

A system and method for stabilizing video using a census kernel having test points. A subset form a connected circle centered on the kernel's center point. For each candidate pixel, a signature is calculated based on the relative brightness of the candidate pixel and of the pixels corresponding to test points when the kernel overlays the image with the center point over the candidate pixel. A candidate pixel is designated to be a corner pixel by processing the signature to determine that the candidate pixel is significantly brighter or darker than the test point pixels. For each corner pixel, a corresponding pixel in the previous frame is identified by comparing the signature of the corner pixel with signatures of pixels in the previous frame, and a corresponding motion
(Continued)

vector is established. A motion model is calculated based on the motion vectors and applied to the digital frame.

20 Claims, 2 Drawing Sheets

(52) U.S. Cl.
CPC .............. *G06T 2207/10016* (2013.01); *G06T 2207/20021* (2013.01); *G06T 2207/20024* (2013.01)

(56) References Cited

U.S. PATENT DOCUMENTS

| | | | | |
|---|---|---|---|---|
| 2012/0162449 A1* | 6/2012 | Braun | .................... | H04N 5/145 |
| | | | | 348/208.4 |
| 2014/0204227 A1* | 7/2014 | Spampinato | ....... | H04N 5/23254 |
| | | | | 348/208.1 |

OTHER PUBLICATIONS

J.-B. Chun et al., "Suppressing Rolling-Shutter Distortion of CMOS Image Sensors by Motion Vector Detection," IEEE Transactions on Consumer Electronics, vol. 54, No. 4, Nov. 2008, pp. 1479-1487.
Karpenko et al., "Digital Video Stabilization and Rolling Shutter Correction using Gyroscopes," Stanford Tech Report CTSR Mar. 2011, pp. 1-7.
Grundman et al., "Auto-Directed Video Stabilization with Robust L1 Optimal Camera Paths," pp. 225-232.

* cited by examiner

VIDEO STABILIZATION SYSTEM AND METHOD

PRIORITY CLAIM

This application claims benefit from International Application No. PCT/CA2017/000036, filed Feb. 24, 2017, which is incorporated herein by reference in its entirety for all purposes.

TECHNICAL FIELD

The subject matter of the present disclosure generally relates to the field of video image processing. More particularly, the subject matter of the present disclosure technically relates to stabilizing video image frames due to relative inter-frame motion between the video capture device and the target being viewed.

BACKGROUND

Video instability is a common problem in today's camera systems. Cameras are often used in unstable situations, ranging from holding a hand-held camcorder in one's hands, to cameras mounted on moving platforms such as airplanes or automobiles, to surgical visualization systems such as Drive. This results in blurring associated with the motion of a camera or other imaging device during exposure. Video stabilization may be employed to attempt to compensate for the motion. This problem is compounded by several factors.

Video stabilization is a computationally intensive process, especially at high resolutions and frame rates.

Modern CMOS sensors often use a rolling shutter, which makes stabilization more challenging. This is because in addition to correcting for translation and rotation, one also has to correct for a per-row deformation due to the rolling shutter.

In a system where the video feed is used by a human to perform an action, latency is a key factor. Increasing latency increases discomfort and reduces the ability of the operator to perform their task. This is key in applications such as surgical intervention (e.g. endoscopy/exoscopy) and in head-mounted displays.

Video stabilization systems must often operate in compute-limited environments. For example, they are often used in mobile or embedded systems.

SUMMARY

The invention described herein provides a method of stabilizing digital video received from a video source as a sequence of digital frames. Each digital frame is an array of image pixels, each image pixel having a value.

The method employs a census kernel that is an array of points including a center point with value 0. Each point has a binary value (i.e. 0 or 1). The array has 2N+1 rows and 2N+1 columns, where N is an integer greater than 1. A total of T test points in the census kernel have value 1 and the other points have value 0, T being an integer greater than or equal to 8. A subset of the test points in the census kernel form a connected circle centered on the center point.

For each candidate image pixel in each digital frame spaced apart by at least N pixels from an edge of the digital frame, a digital signature of the candidate image pixel having 2T bits consisting of T brighter bits and T darker bits is computed by first aligning the center point of the census kernel with the candidate image pixel and selecting the image pixels corresponding to the test points in the census kernel. Then, for each selected image pixel (a) a brighter bit of value 1 is included in the signature if the sum of the value of the selected image pixel and a threshold value Tb is less than the value of the candidate image pixel, or otherwise a brighter bit of value 0 is included in the signature, and (b) a darker bit of value 1 is included in the signature if the value of the selected image pixel is greater than the sum of the value of the candidate image pixel and a second threshold value, or otherwise a darker bit of value 0 is included in the signature. Then, all the darker bits in the digital signature corresponding to test points on the connected circle are summed, and if the sum is greater than a threshold Tdnc, the candidate image pixel is designated to be a corner pixel, or, alternatively, a maximum number of darker bits having value 1 in the digital signature corresponding to contiguous test points on the connected circle is counted, and if the number is greater than a threshold Tdc, the candidate image pixel is designated to be a corner pixel.

All the brighter bits in the digital signature corresponding to test points on the connected circle are then summed, and if the sum is greater than a threshold Tbnc, the candidate image pixel is designated to be a corner pixel, or, alternatively, a maximum number of brighter bits having value 1 in the digital signature corresponding to contiguous test points on the connected circle is counted, and if the number is greater than a threshold Tbc, the candidate image pixel is designated to be a corner pixel.

For each digital frame following a previous digital frame in the sequence of digital frames, the digital frame is stabilized as follows. For each corner pixel in the digital frame, an attempt is made to identify an image pixel in the previous digital frame corresponding to the corner pixel based on the Hamming distances between the digital signature of the corner pixel and the stored digital signatures of the image pixels in the previous digital frame. If a corresponding image pixel is identified, then a motion vector for the corner pixel is calculated based on difference in locations of the corner pixel and the identified corresponding image pixel. Then, a motion model is calculated based on the motion vectors, and the motion model is applied to the digital frame to produce a stabilized frame.

More generally, a candidate image pixel may be designated to be a corner pixel based on analysis of the bits of value 1 in the digital signature corresponding to test points on the connected circle.

The census kernel is preferably invariant under reflections about horizontal and vertical axes of the census kernel. The census kernel is preferably invariant under reflections about diagonals of the census kernel.

The connected circle is preferably a Bresenham circle.

T is preferably greater than the number of points on the connected circle.

Each digital frame may be received at an approximately constant interval following the previous digital frame, the interval being referred to as the frame time, and each stabilized frame may then be displayed on a display screen within no more than twice the frame time after reception of the digital frame from which the stabilized frame was derived.

The computation of the digital signatures may be performed in real-time as each digital frame is received and the application of the motion model to each digital frame may be done in real-time so that each stabilized frame is produced within 0.05 seconds after the corresponding digital frame was captured. Each stabilized frame may be displayed on a display screen immediately after it is produced. The method may be performed by one or more field-programmable gate arrays.

For each corner pixel in one of in the digital frames having an identified corresponding image pixel in the previous digital frame, the identified corresponding image pixel may be the image pixel in the previous digital frame within a pre-determined distance from the corner pixel that has the smallest Hamming distance from the corner pixel.

Each digital frame may be partitioned into a plurality of non-overlapping tiles, and a single tile motion vector may be calculated for each tile based on the motion vectors for corner pixels in the tile, in which case the motion model is calculated based on the tile motion vectors. A statistical comparison of the tile motion vectors may be performed and motion vectors determined to be outliers may then be discarded and not used in calculating the motion model. Temporal filtering may be performed on the tile motion vectors so that the motion model produces a smooth compensation effect over time.

Each image pixel may be an element of a color space and the value of the image pixel may be equal to the intensity or luminosity of the image pixel.

Each of Tb and Td may have a value of 0. Each of Tb and Td may have a value of at least 1.

In preferred embodiments, the candidate image pixel is designated to be a corner pixel only if (a) the sum of all the darker bits in the digital signature corresponding to test points on the connected circle is greater than Tdnc, or (b) the sum of all the brighter bits in the digital signature corresponding to test points on the connected circle is greater than Tbnc. N may be greater than or equal to 4, 16 points in the census kernel may be on the connected circle, and Tdnc and Tbnc may be greater than 8. N may be equal to 4 and T may be equal to 32.

The invention also provides a system for stabilizing real-time digital video received from a video source as a sequence of digital frames, where each digital frame is an array of image pixels, each image pixel having a value. The system employs a census kernel, which is an array of points including a center point with value 0. Each point in the census kernel has a binary value (i.e. 0 or 1). The array has 2N+1 rows and 2N+1 columns, N being an integer greater than 1. A total of T test points in the census kernel have value 1 and the other points have value 0, where T is an integer greater than 8. A subset of the test points in the census kernel form a connected circle centered on the center point. The system has an input interface configured to receive the digital frames from the video source in real-time and an output interface configured to transmit stabilized digital frames to a display device in real-time. The system also includes a computer processor that is electronically connected to the input interface and the output interface.

The computer processor is configured to receive from the input interface a digital frame temporally following a previous digital frame in the sequence of digital frames. For each candidate image pixel in each digital frame spaced apart by at least N pixels from an edge of the digital frame, the computer processor computes and stores a digital signature of the candidate image pixel having 2T bits consisting of T "brighter bits" and T "darker bits". This is done by first aligning the center point of the census kernel with the candidate image pixel, and then selecting the image pixels corresponding to (i.e. overlaid by) the test points in the census kernel. Then for each selected image pixel (a) a brighter bit of value 1 is included in the signature if the sum of the value of the selected image pixel and a threshold value Tb is less than the value of the candidate image pixel, or otherwise a brighter bit of value 0 is included in the signature, and (b) a darker bit of value 1 is included in the signature if the value of the selected image pixel is greater than the sum of the value of the candidate image pixel and a threshold value Td, or otherwise a darker bit of value 0 is included in the signature.

The computer processor sums all the darker bits in the digital signature corresponding to test points on the connected circle, and if the sum is greater than a threshold Tdnc, the candidate image pixel is designated to be a corner pixel, or alternatively counts the maximum number of darker bits having value 1 in the digital signature corresponding to contiguous test points on the connected circle, and if the number is greater than a threshold Tdc, the candidate image pixel is designated to be a corner pixel.

The computer processor sums all the brighter bits in the digital signature corresponding to test points on the connected circle, and if the sum is greater than a threshold Tbnc, the candidate image pixel is designated to be a corner pixel, or alternatively counts the maximum number of brighter bits having value 1 in the digital signature corresponding to contiguous test points on the connected circle, and if the number is greater than a threshold Tbc, the candidate image pixel is designated to be a corner pixel;

For each corner pixel in the digital frame, the computer processor attempts to identify an image pixel in the previous digital frame corresponding to the corner pixel based on the Hamming distances between the digital signature of the corner pixel and the stored digital signatures of the image pixels in the previous digital frame. If a corresponding image pixel is identified, a motion vector for the corner pixel is calculated based on difference in locations of the corner pixel and the identified corresponding image pixel. Then a motion model is calculated based on the motion vectors, and the motion model is applied by the computer processor to the digital frame to produce a stabilized frame, and the stabilized frame is transmitted to the display device via the output interface.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In general, an image stabilization system performs several key steps as outlined below.

Feature detection: In each frame of video, the system must find distinct features. This may be done with some sort of corner detector such as the Harris corner detector or SIFT (Scale Invariant Feature Transform).

Feature matching: The system must match the features found in the current frame with previous, historical frames. This step establishes how the image has moved from frame to frame. Many methods exist in the literature to perform this step. The majority rely on taking each feature point and comparing the pixel neighbourhood around it to the neighbourhood around nearby feature points. Based on the neighbourhood, a similarity metric is calculated. Points with the best score are considered to be "matched". Examples of feature matching algorithms include cross-correlation, SAD (Sum of Absolute Differences), and the census transform.

Motion vector calculation: Based on the matched features, motion vectors are calculated from the previous frame to the current frame.

Motion estimation: Based on the motion vectors found in the image, a model of the motion must be estimated. It is not enough to simply sum up or average the motion vector field. This is because scenes are complex and several factors can cause individual motion vectors to be invalid, or to be outliers, such as those discussed below.

Feature detection and feature matching can result in errors. For example, features may be matched where in reality they do not come from the same part of the scene. This can arise due to a variety of sources, such as from image noise, the aperture problem, and lack of scene texture Not all objects in the field of view are rigid. There can be scene deformation. For example, in surgery, many parts of the field of view pulse as blood is circulated by the heart. Also, tissue is soft and deforms as it is operated on by the surgeon. In surgical applications, these effects can be dominant in the field of view.

At high magnification, depth of field is a problem. Only certain parts of the field of view may be in focus.

Foreground motion: Not all parts of a scene move equally. For example, moving objects will have their own motion that is distinct from the camera's vibration. This includes rapidly moving objects such as cars, pedestrians, or surgical instruments.

As a result, the motion vector field must be mapped to a known motion model in a way that is robust to the above-mentioned outliers.

Temporal filtering: Once motion is estimated, temporal filtering is preferably applied. This is important in order to produce a smooth compensation effect over time. Lack of temporal filtering can introduce a "synthetic" vibration.

Warping: Once the motion model is known, it must be applied to the live video stream. Each frame must be deformed, or "warped" to actively compensate for the detected vibration.

In prior art approaches feature detection and feature matching are done as completely separate computational steps, which are each very computationally intensive, thus making it challenging to perform stabilization in real-time. In the present system, feature detection and feature matching are combined by computing a single digital signature for each image pixel and using those signatures for both feature detection and feature matching.

Figure 2:
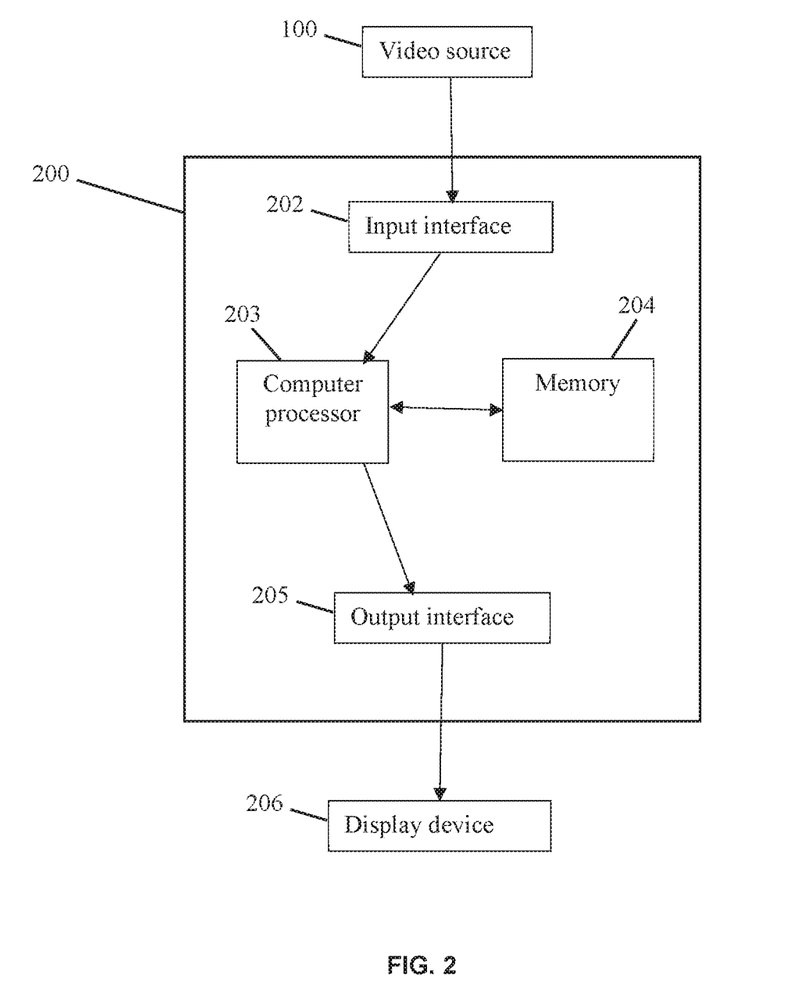
FIG. 2 shows the main components of an image stabilization system receiving video data from a video source, processing the video to stabilize it and displaying the stabilized video on a display device.

FIG. 2 depicts the main elements of a stabilization system 200 that receives video data from a video source 100, processes the video data to stabilize each frame, and displays stabilized video data on a display device 206.

The video source 100 typically provides digital video data consisting of a sequence of digital frames at a fixed frame rate. For example, a frame may be captured and transmitted to the input interface 202 every ⅟₆₀ of a second (about 0.0167 seconds) so that the frame rate is 60 Hz. Higher or lower frame rates may be used, although it is generally preferred that the frame rate be at least 20 Hz (0.05 seconds per frame). Each digital frame consists of an array of pixels. For example, for "high definition" (HD) video, each frame may consist of an array of 1920 by 1080 pixels. Various larger or smaller frame sizes may alternately be used, and the aspect ratio may vary.

In general, each pixel is an element of a color space. A "color space" is a particular coordinate representation of points in a particular color colour model, such as YCbCr or RGB. In the RGB color space the Cartesian (cube) representation of an RGB colour model having orthogonal red, green and blue axes is used. A digital color image/frame is composed of pixels that have values in a three dimensional color space. For example, values provided by a camera for each pixel are typically represented by three numbers, such as three 5, 8, 12 or 16 bit digital values, corresponding to the intensities of red, green and blue in what may be referred to as the RGB colour space. The RGB colour space is widely employed for video equipment, such as cameras and displays. Examples of color spaces include RGB, HSV (hue, saturation and value), HSL (hue saturation and level), YCbCr, Y'CbCr, Y Pb/Cb Pr/Cr, XYZ, and CIELAB. In general, the stabilization method of the present invention is performed by calculating a motion model based on a single dimension of the color space, which is generally the intensity or greyscale value of each pixel. For example, when YCbCr is employed, the lama, or luminosity, (Y) channel value provides such greyscale values. If such a value is not provided directly by the video source 100 for each image pixel, then when a digital video frame is received the system converts the frame to an array of single values (e.g. 8-bit, 12-bit or 16-bit intensity values), based on which the motion model is derived. Once the model is determined, of course, it is applied to each dimension of the color values, thereby stabilizing the color video. The term pixel, as used herein except as otherwise expressly indicated or clearly implied, refers to a point in a frame with a single intensity value.

It is assumed herein that the video received from the video source 100 is received as a sequence of digital frames, each digital frame comprising an array of image pixels. In some cases, the video source may not provide complete frames. For example, a frame may be represented by specifying differences from a prior frame or the information may be otherwise temporally or spatially compressed. In such cases, the frames may first be reconstructed as complete arrays of pixel values.

The video data is received by an input interface 202 in the system 200, which is generally a standard off-the-shelf video interface, and, similarly, stabilized video data is sent to a display device 206, or other device such as a storage system, via a standard off-the-shelf video output interface 206.

Figure 1:
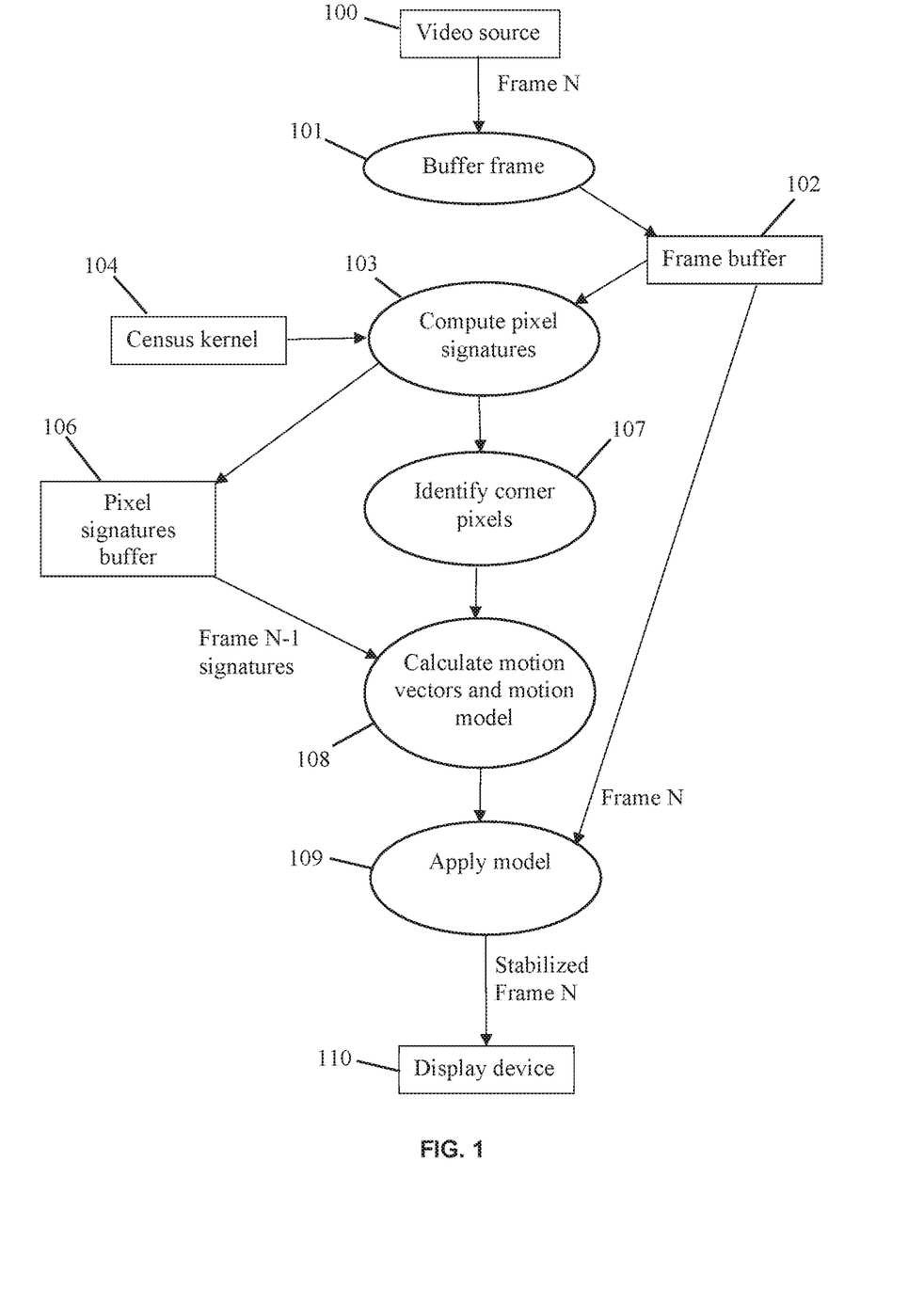
FIG. 1 depicts the main steps of a method to stabilize video data.

When a new digital frame is received in the present system from a video source 100, the frame may be buffered 101 in a frame buffer 102 as depicted in FIG. 1. The video source 100 may be, for example, a video camera, a surgical microscope or a storage device.

In real-time embodiments, video frames are captured by an image capture device (which may be part of the video source 100), transmitted by the video source 100 to the system 200, stabilized, and the stabilized frames displayed in real-time. Generally "real-time" means that the output stabilized frames are produced at the input video frame rate, and that the latency between receipt of a video frame and display, or output, of a stabilized video frame, is low. In this context, "low" means most preferably no more than one to two times the inter-frame period ("frame time") of the incoming video (i.e the inverse of the frame rate), which would be no more than about 0.017-0.034 seconds for 60 Hz video. In some applications, higher latency may be acceptable, but for real-time applications, a latency of no more than 0.1 seconds is preferred and more preferably no more than 0.05 seconds. More generally, it is preferred that each stabilized frame is produced and displayed within two frame times after it is received, or preferably after it was captured.

The system 200 includes a computer processor 203 that is electronically connected to the input interface 202 to receive input video data and to the output interface 205 to transmit stabilized video data to a display device 206 or other output device, such as a storage device. The computer processor 203 is also electronically connected to memory 204, which may include multiple memories with varying capacities and speed. Generally, at a minimum, memory sufficient to store several frames of video data and pixel signatures that is sufficiently fast that frames can be stored and retrieved from the memory with latency less than the frame time is required.

Non-real-time or faster than real-time embodiments of the invention are also possible. "Real-time" processing generally means processing the video frames and producing stabilized video frames at the frame rate at which the video was captured. The output interface 205 may be configured to store the stabilized image frames in a storage device, such as a hard disk. In some embodiments, the input interface may retrieve stored video data from a data storage device, which retrieval may be done at a frame rate higher or lower than the frame rate at which the video was captured. In such embodiments, the steady-state video retrieval rate is constrained (throttled) by the processing power of the computer processor 203 and is decoupled from the video capture rate. In general though, where the stabilized video data is displayed on a display device, it is preferred that the stabilized video data be displayed with the same frame rate as the source video data used to produce it. Of course, options may be provided to freeze the video or increase or decrease the frame rate relative to the original frame rate, depending on the capabilities of the computer processor.

The basic processing performed by the computer processor 203 for each digital frame in a video stream is depicted by the ovals in FIG. 1. In addition to the video data, inputs to the processing include a census kernel 104 and various thresholds that will be described.

The census kernel is an array of points (which may be referred to as pixels) having binary values. In general, the census kernel has 2N+1 rows and 2N+1 columns, N being an integer greater than 1, so that there are an odd number of rows and an odd number of columns, and there is a center point equidistant from all four edges of the array. Numbering the rows and columns from 0 to 2N, the center point is the Nth pixel in the Nth row of the kernel. The center point has a value of 0. A number of points in the kernel, referred to herein as "test points", have value 1. The kernel is preferably invariant under reflections about the horizontal and vertical axes of the kernel, so the number of test points, referred to herein as "T", is a multiple of 4. T is greater than or equal to 8 and generally is less than the total number of points in the kernel, which is (2N+1)*(2N+1), so that at least some of the points in the census kernel are equal to 0. Although this is not essential, it is preferred in order to reduce the computational requirements. Preferably, no more than half of the points in the census kernel have value 1.

It is also preferred that the kernel be invariant under reflections about diagonals of the census kernel. Adopting a coordinate system with the center point at (0,0), these reflective symmetry constraints mean that each set of 4 or 8 points, (i,j), (−i,−j), (i,−j), (−i,j), (j,i), (−j,−i), (j,−i), (−j,i) have the same value (the set having only 4 unique points when the pixels are on the diagonals (i=j or i=−j), horizontal axis (i=0) or vertical axis (j=0), where i and j are integers in the range 1 to N.

An example census kernel with N=4 and T=32 is the following 9×9 data structure:

*const* uint8_t g_census_kernel[9][9] =

{{1, 0, 0, 0, 1, 0, 0, 0, 1}, {0, 1, 0, 1, 1, 1, 0, 1, 0},

{0, 0, 1, 0, 1, 0, 1, 0, 0}, {0, 1, 0, 0, 0, 0, 0, 1, 0},

{1, 1, 1, 0, 0, 0, 1, 1, 1}, {0, 1, 0, 0, 0, 0, 0, 1, 0}, {0, 0, 1, 0, 1,

0, 1, 0, 0}, {0, 1, 0, 1, 1, 1, 0, 1, 0}, {1, 0, 0, 0, 1, 0, 0, 0, 1}};

A census transform performed using a census kernel can be used to identify pixels in the previous frame that correspond to (i.e. "match") particular pixels of interest in the current frame via the calculation of a digital signature for pixels of interest in the current frame and for pixels in the previous frame. Ideally, the matched pixel is (part of) the same feature in the previous frame as the pixel of interest in the current frame. It should be noted that, although matching of "pixels" is generally referred to herein, it is not just the pixels that are being compared but rather image patches centered on the pixels, each patch comprising (2N+1)*(2N+1) pixels that are sampled according to the test points in the census kernel. The signatures described herein may be referred to either as pixel signatures or patch signatures. The described approach is simpler and more computationally efficient than techniques such as correlating the patches.

Given a pixel of interest in the current frame that is at least N pixels from an edge of the digital frame (i.e. if the frame has dimensions U by V and is indexed as (1 . . . U, 1 . . . V), then the pixel of interest has coordinates in the range (N . . . U−N+1, N . . . V−N+1)), the census kernel is overlaid on the frame with the center point of the kernel over the pixel of interest, and then the T pixels in the frame corresponding to (i.e. overlaid by) test points in the overlaid census kernel are analyzed.

The census signature consists of 2T bits, T of the bits being referred to herein as "brighter bits" and T of the bits being referred to as "darker bits". Two thresholds are employed, which may be referred to Tb and Td. Tb and Td may be 0, but are preferably both are greater than 0. In general, Tb and Td are equal to each other, but this is not essential. Tb and Td are not necessarily constant but rather may be calculated as a function of the intensity of the pixel of interest.

For each of the T test points, one brighter bit and one darker bit is included in the signature. The ordering of the bits in the signature is not generally important but the bit ordering must be consistent from signature to signature so that, for example, Hamming distance calculations are meaningful, and it is known for each bit in the signature that the bit is either a brighter bit or a darker bit and it is known to which test point in the kernel the bit corresponds.

For each test point, a brighter bit of value 1 is included in the signature in association with the test point if the sum of the value of the pixel corresponding to the test point and Tb is less than the value of the pixel of interest; otherwise a brighter bit of value 0 is included in the signature in association with the test point (a "1" value effectively meaning that the pixel of interest is brighter than the pixel corresponding to the test pixel). Similarly, for each test point, a darker bit of value 1 is included in the signature in association with the test point if the value of the pixel corresponding to the test point is greater than the sum of the value of the pixel of interest and Td; otherwise a darker bit of value 0 is included in the signature in association with the test point.

Using the above example census kernel with T=32, the signature for each pixel of interest consists of 64 bits. In the present method, a census signature is computed 103 for every pixel in each frame (ignoring the pixels within N pixels of the edges of the frame). The signatures are stored in a pixel signatures buffer 106 for later reference so that when the current frame is being analyzed, the signatures of the pixels in the previous frames) are available. The pixel in the previous frame that best matches the pixel of interest in the current frame is the pixel with the minimum Hamming distance between the signature of the pixel in the previous frame and the signature of the pixel of interest. The Hamming distance is the number of bit positions at which the two signatures differ. Generally, only pixels in the previous frame within a certain pixel distance of the pixel of interest will be considered, both to reduce the computational burden and to avoid spurious matches. The maximum change in position of a feature from one frame to another can be estimated based on knowledge of the subject matter of the video, and a suitable distance within which to search for matching pixels in the previous frame can then be specified. If more than one pixel in the previous frame has the same minimum Hamming distance then, for example, the pixel closest in position to the pixel of interest may be selected, one pixel can be arbitrarily selected, or one may otherwise be determined.

In order to reduce the occurrence of incorrect matches, it is generally required that the Hamming distance between the matching pixel and the pixel of interest be below some minimum value, and if there is no pixel with a Hamming distance below the minimum value then no match for the pixel of interest is considered to have been found.

Once a matching pixel is determined for a pixel of interest, a motion vector for that pixel/patch can be defined based on the difference in position of the two pixels (i.e. the vector has a start point at the location of the matching pixel and an end option at the position of the pixel of interest and represents an estimate of the movement of the feature associated with the pixel of interest between the two frames).

In order to derive a useful set of motion vectors, a suitable set of pixels of interest in the current frame must be determined. Such motion vectors are generally useful (i.e. accurate) only where there is sufficient variation in the patch surrounding the pixel of interest containing a feature that the Hamming distance provides a measure that reliably distinguishes the same feature in the previous frame from other features in the previous frame. This can be done by identifying "corner" pixels 107 in the current frame. Corner pixel identification could be done, for example, as a first step by using a FAST transform. However in the present method, corner detection is done using the same census signatures that are used to match pixels (i.e. the patches containing the pixels) between frames based on analysis of the bits of value 1 in the digital signature corresponding to test points on the connected circle.

This is a computationally efficient approach compared to a two pass process, and the use of such bit signatures makes the method particularly suitable for very efficient implementation using a hardware-based approach, such as implementations employing field-programmable gate arrays (FPGAs) or application-specific integrated circuits (ASICs).

Of key importance to the present approach is that a subset of the test points in the census kernel used in the current system and method must form a "connected circle" centered on the center point. Such a subset is shown in the above depicted census kernel in bold font, being the test points at positions (−3,1), (−3,0), (−3,1), (−2,−2), (−2,2), (−1,−3), (−1,3), (0,−3), (3,−1), (3,0), (3,1), (2,−2), (2,2), (1,−3), (1,3) and (0,3).

The test points on the connected circle are shown below in a stand-alone corner detection kernel.

*const* uint8_t g_fast_corner_kernel[7][7] =

{{0, 0, 1, 1, 1, 0, 0}, {0, 1, 0, 0, 0, 1, 0}, {1, 0, 0, 0, 0, 0, 1}, {1, 0, 0, 0, 0,

0, 1}, {1, 0, 0, 0, 0, 0, 1}, {0, 1, 0, 0, 0, 1, 0}, {0, 0, 1, 1, 1, 0, 0}};

By "connected", it is meant that each point in the circle is adjacent to exactly two other points in the circle, where a point (i,j) is considered to be adjacent to the points (i,j+1), (i+1,j), (i,j−1), (i−1,j−1), (i+1,j−1), and (i+1,j+1), where i and j are integers in the range of 1 to N. By "circular" it is meant that if one were to draw edges from the center of each point in the circle to the center each adjacent point, the resulting polygon would provide a reasonable approximation of a circle, given the number of points in the circle, as would be understood by a skilled person. Preferably the connected circle is a Bresenham circle determined using the I2IT midpoint algorithm, an algorithm that is often used to determine the points needed for rasterizing a circle. This is not essential however. For example one could alternately use a variation of the connected circle shown above where the test points (0,−3), (−3,0), (0,3) and (3,0) are replaced by the test points (0,−4), (−4,0), (0,4) and (4,0). It is also not essential that the circle be perfectly symmetric about the vertical, horizontal and diagonal axes, although this is preferred.

The corner detection kernel embedded in the census kernel may be referred to as a FAST kernel, where FAST stands for "features from accelerated segment". The minimum number of points in a connected circle is 8 (for example, where the points are at (−1,−1), (−1,0), (−1,1), (0, −1), (0,1), (1,−1), (1,0), (1,1)) but preferably there are at least 16 points in the circle. The preferred size of the circle may depend on the nature of the subject and the resolution of the video. It is also preferred that T be greater than the number of points in the connected circle (i.e. the subset of test points forming the connected circle is a proper subset of all the test points), although this is not essential. In the typical embodiment of a census kernel depicted above, T is 32 and a subset of 16 points forms a connected circle corresponding to a FAST kernel.

When the current frame is received, the census signatures are calculated as described above and stored. Then corner pixels are identified in the current frame in one of two ways. The first method, which is preferred, uses thresholds Tdnc and Tbnc ("b" referring to brighter, "d" referring to darker, and "nc" referring to non-contiguous). Tdnc and Tbnc are generally integers equal to each other and greater than zero, but they may differ in value and one or both may be zero, although this is not preferred. For example, if the circle has 16 points, Tbnc and Tdnc may be in the range of 9-13. Two steps are performed for each image pixel. First, all the darker bits in the digital signature corresponding to test points on the connected circle are summed (or, equivalently, the number of 1 bits is counted), and if the sum is greater than Tdnc, then the image pixel is designated to be a corner pixel. Second, all the brighter bits in the digital signature corresponding to test points on the connected circle are summed, and if the sum is greater than Tbnc, then the image pixel is designated to be a corner pixel. Of course, it is not necessary to perform the second step if the image pixel is determined to be a corner pixel in the first step, but in many implementations it may be simplest to always perform both steps. The order of these steps is of no consequence.

The second method uses thresholds Tdc and Tbc ("b" referring to brighter, "d" referring to darker, and "c" referring to contiguous). Tdc and Tbc are generally equal to each other and greater than zero, but they may differ in value and one or both may be zero, although this is not preferred. Two steps are performed for each image pixel. First, the maximum number of darker bits in the digital signature corresponding to one sequence of contiguous test points on the connected circle having value 1 is determined. Two test points are contiguous if they are adjacent. If the number is greater than Tdc, then the image pixel is designated to be a corner pixel. Second, the maximum number of brighter bits in the digital signature corresponding to one sequence of contiguous test points on the connected circle having value 1 is determined. If the number is greater than Tbc, then the image pixel is designated to be a corner pixel. Of course, it is not necessary to perform the second step if the image pixel is determined to be a corner pixel in the first step. For example, if the circle has 16 pixels, Tbc and Tdc may be in the range of 8-12. Other approaches to analyzing the bits of value 1 in the digital signature corresponding to test points on the connected circle may alternatively be used to identity corner pixels.

After the corner pixels in the current frame have been identified using the signatures, then for each corner pixel the system attempts to identify an image pixel in the previous digital frame corresponding to the corner pixel based on the Hamming distances between the digital signature of the corner pixel and the stored digital signatures of the image pixels in the previous digital frame, as discussed above. For each corner pixel for which a match is found in the previous frame, a motion vector is calculated. The motion vectors are then used to calculate a motion model 108 and that motion model is then applied to the current frame 109 to produce a stabilized frame that is transmitted to a display device 110 in a real-time scenario.

It should be noted that "display device" as used herein includes any system capable of receiving the output stabilized video data and displaying video corresponding to the stabilized video data so that a user can view it. The display device may do further processing, for example, before displaying the video data. The display of video may, in some embodiments, be decoupled from the stabilization system, for example by a buffering system that stores the stabilized video data. Such a buffering system may be part of what is referred to herein as a display device. For example, in some embodiments, all the stabilized video data may be stored in the buffer of the display device before any of it is displayed.

An alternative method that further combines the feature detection and matching is to calculate a census matching index (CMI). For a pixel (Pc) in the current frame and a pixel (Pp) in the previous frame, CMI is calculated as the sum of the total number of bits of value 1 in the signatures of Pc and Pp, less the Hamming distance between the signatures of Pc and Pp. The idea is that a pixel/patch signature with more 1's has more structure (combination of brighter and darker pixels) and is therefore more difficult to match to its neighbouring patches. The patches with a high number of 1's will represent two patches that are difficult to match. The Hamming distance represents how well they are matched. If the Hamming distance is low, then the two patches are well matched. If the patches are structurally complex and well matched, the CMI will be high.

In many typical applications, it is desirable to remove background vibration while not being influenced by the movement of foreground objects. For example, if a camera is mounted to surveil an intersection, one does not want the scene to shift due to pedestrians crossing the street. In a surgical scenario, it is undesirable for surgical tools in the field of view to cause the image to shift while it is being stabilized. This is a challenging problem to solve as tool movement is unconstrained. Also, tools are generally highly textured. They are often more textured than the background scenery, which may be smooth or out of focus. In surgical applications, the subject will also not generally be still. For example, tissue is deformable and will pulse with blood flow and while being operated on. All of the previously mentioned influences can cause a stabilization algorithm to react to the outliers and introduce unnatural scene motion. The introduction of unwanted scene motion can be viewed as an artifact of stabilization.

In the present system and method, each video frame is preferably segmented, or partitioned, into non-overlapping tiles, which are preferably rectangular. For example, an HD image (1920×1080 pixels) may be segmented into 20×10 tiles. The use of tiles with a limited vertical extent means that the rolling shutter effect is much reduced. Within each tile the rolling shutter effect is relatively small. The effect is significant across tiles, but this is compensated for by the present approach where separate motion vectors are used for different tiles to compute the motion model. Such a tiled approach is also useful for scenarios such as video of a surgical operation where surgical tools appear in the video frame and are frequently moving. Even though the tools generally have a lot of texture that is relatively easy to track, they only take up a small portion of the screen. In order to ignore the tools one just needs to ignore the regions of the image that contain portions of the tools. The motion of each tile is measured, and tiles that are statistically different from the average ("outliers"), which may indicate that portions of moving tools are present in those tiles, are thrown out.

In other embodiments, a plurality of partially overlapping tiles may alternatively be employed, although non-overlapping tiles are generally preferred.

Statistical methods are used to determine the motion of each tile. Within each tile is a collection of matched pixels (derived using the previous methods described), For all of the matched pixels, a motion vector is defined from start to finish. Each motion vector lies on a 2D grid of possible values. For each matched pixel, we say that the match "votes" for a pixel on that 2D grid. All of the votes are collected and the grid value with the highest number of votes is considered the most likely motion for the tile, and so may then be designated the tile motion vector. This can also be viewed as a histogram of values where the median value is the most likely motion vector. Of course, the median value may be calculated using interpolation with sub-pixel accuracy. Other methods of creating an equivalent histogram may also be employed, such as sum of Hamming distances and sum of CMI.

The statistical comparison between all tiles of the image can be performed with a clustering approach. The motion vectors are grouped into clusters and a clustering algorithm is used to select the cluster representing background motion. Other methods for defining statistical significance may be used. These include auto-correlation of the field, measures of randomness, statistical tests (e.g. F-test), and fitting to a mixture of Gaussians (MoG), among others.

Furthermore, in many scenarios it is desirable to fail gracefully rather than introduce unwanted scene motion. For example, viewers will generally find it less objectionable to see natural scene vibration than to have the scene shift in ways that are foreign to their expectations. If clustering fails or is ambiguous, the system can default to performing no correction. This maintains natural scene appearance, which is critical for successful user acceptance of an electronic stabilization system.

After outliers are filtered out, the tile motion vectors are fitted to a motion model. Typically, an affine model (magnification, rotation, translation, and shear) is sufficient for most rolling shutter applications. Other motion models could be fitted to the scene, including quadratic spline to each row/column, penalized smoothing splines to each row/column, rigid transform (scale, rotation, translation), translation only and deformable grid.

Typically, an error minimization algorithm is used to perform the fit, such as a least squares fit. Iterative outlier rejection methods, such as RANSAC (random sampling and consensus) may also be used.

Despite best efforts, it is likely that frames will exist where the stabilization results are poor. This can occur for a number of reasons, such as blur or rapid motion, motion that is greater than the ability of the algorithm to correct, occlusions, image noise and poor focus.

It is therefore preferred to apply a temporal motion filtering algorithm to smooth out motion and reduce temporal noise on the fitted results. In this case, an exponential model may be used. Temporal motion compensation in this algorithm is intended to smooth shaky motion while allowing the camera and the focal elements to move over time. This is done by tracking the camera offset of each frame with respect to the previous frame and gradually moving the offset to zero. Frame 0 is given a 0 offset. Frame 1 is given an offset defined by the estimated motion offset[1]. Frame 1 is warped so as to move it to the 0 offset. A new offset is calculated based on comparing frame 1 and 2 offset[2-1] and the offset of frame 2 is defined as a weighted sum of the previous offsets offset[2]=alpha*offset[1]+offset[2-1], where alpha is a parameter of the algorithm. If an offset for a given pair of frames cannot be determined, it is considered to be 0. The alpha value is between 0 and 1 and defines how fast the image returns to offset 0.

The value of alpha is also changed based on the motion. This form of compensation does not work well with constant motion. The stabilized image will tend to lag behind the uncorrected image for the duration of a motion. To compensate for this, a very small value of alpha is used when the motion is constant in one direction (i.e. the trend is high) and returns to a high value of alpha when the trend is low.

Other temporal filtering methods may alternately be used, such as Kalman filtering, particle filtering, etc.

Note that herein a reference to a "previous" frame generally refers to the video frame immediately previous to the current frame (e.g. if the frame rate is 60 Hz, then the previous frame captured about 0.017 seconds before the current frame). Although it is not preferred, in some embodiments the "previous frame" may refer to an earlier frame, or to some combination of multiple previous frames where multiple previous frames are combined into one "previous frame", such as by a weighted average of pixel values.

Generally, a computer, computer system, computing device, client or server, as will be well understood by a person skilled in the art, includes one or more than one electronic computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. It is the express intent of the inventors that a "processor" does not include a human; rather it is limited to be an electronic device, or devices, that perform digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internee, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.) Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed. Unless expressly stated or otherwise clearly implied herein, the conjunction "or" as used in the specification and claims shall be interpreted as a non-exclusive "or" so that "X or Y" is true when X is true, when Y is true, and when both X and Y are true, and "X or Y" is false only when both X and Y are false.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

As used herein, the terms "about", "approximately", and "substantially" are meant to cover variations that may exist in the upper and lower limits of the ranges of values, such as variations in properties, parameters, and dimensions. In one non-limiting example, the terms "about", "approximately", and "substantially" mean plus or minus 10 percent or less.

Unless defined otherwise, all technical and scientific terms used herein are intended to have the same meaning as commonly understood by one of ordinary skill in the art.

The scope of the claims that follow is not limited by the embodiments set forth in the description. The claims should be given the broadest purposive construction consistent with the description and figures as a whole.

What is claimed is:

1. A method of stabilizing digital video received from a video source as a sequence of digital frames, each digital frame comprising an array of image pixels, each image pixel having a value, the method comprising the steps of:

providing a census kernel, the census kernel being an array of points including a center point with value 0, each point having a binary value, the array having 2N+1 rows and 2N+1 columns, N being an integer greater than 1, wherein a total of T test points in the census kernel have value 1 and the other points have value 0, T being an integer greater than or equal to 8, and wherein a subset of the test points in the census kernel form a connected circle centered on the center point;

for each candidate image pixel in each digital frame, a candidate image pixel being any image pixel in the digital frame spaced apart by at least N pixels from an edge of the digital frame:

computing and storing a digital signature of the candidate image pixel having 2T bits consisting of T brighter bits and T darker bits by aligning the center point of the census kernel with the candidate image pixel, selecting the image pixels corresponding to the test points in the census kernel, and for each selected image pixel (a) including a brighter bit of value 1 in the signature if the sum of the value of the selected image pixel and a threshold value Tb is less than the value of the candidate image pixel, or otherwise including a brighter bit of value 0 in the signature, and (b) including a darker bit of value 1 in the signature if the value of the selected image pixel is greater than the sum of the value of the candidate image pixel and a second threshold value, or otherwise including a darker bit of value 0 in the signature;

summing all the darker bits in the digital signature corresponding to test points on the connected circle, and if the sum is greater than a threshold Tdnc, designating the candidate image pixel to be a corner pixel, or counting a maximum number of darker bits having value 1 in the digital signature corresponding to contiguous test points on the connected circle, and if the number is greater than a threshold Tdc, designating the candidate image pixel to be a corner pixel;

summing all the brighter bits in the digital signature corresponding to test points on the connected circle, and if the sum is greater than a threshold Tbnc, designating the candidate image pixel to be a corner pixel, or counting a maximum number of brighter bits having value 1 in the digital signature corresponding to contiguous test points on the connected circle, and if the number is greater than a threshold Tbc, designating the candidate image pixel to be a corner pixel;

for each digital frame following a previous digital frame in the sequence of digital frames:

for each corner pixel in the digital frame, attempting to identify an image pixel in the previous digital frame corresponding to the corner pixel based on the Hamming distances between the digital signature of the corner pixel and the stored digital signatures of the image pixels in the previous digital frame, and, if a corresponding image pixel is identified, calculating a motion vector for the corner pixel based on difference in locations of the corner pixel and the identified corresponding image pixel;

calculating a motion model based on the motion vectors; and applying the motion model to the digital frame to produce a stabilized frame.

2. The method of claim 1, wherein the census kernel is invariant under reflections about horizontal and vertical axes of the census kernel and is invariant under reflections about diagonals of the census kernel.

3. The method of claim 1, wherein the connected circle is a Bresenham circle.

4. The method of claim 1, wherein T is greater than the number of points on the connected circle.

5. The method of claim 1, wherein each digital frame is received at an approximately constant interval following the previous digital frame, the interval being referred to as the frame time, and wherein each stabilized frame is displayed on a display screen within no more than twice the frame time after reception of the digital frame from which the stabilized frame was derived.

6. The method of claim 1, wherein the computation of the digital signatures is performed in real time as each digital frame is received and the application of the motion model to each digital frame is done in real-time so that each stabilized frame is produced within 0.05 seconds after the corresponding digital frame was captured.

7. The method of claim 1, wherein for each corner pixel in one of in the digital frames having an identified corresponding image pixel in the previous digital frame, the identified corresponding image pixel is the image pixel in the previous digital frame within a pre-determined distance from the corner pixel that has the smallest Hamming distance from the corner pixel.

8. The method of claim 1, wherein each digital frame is partitioned into a plurality of non-overlapping tiles, and wherein a single tile motion vector is calculated for each tile based on the motion vectors for corner pixels in the tile, and the motion model is calculated based on the tile motion vectors.

9. The method of claim 8, wherein a statistical comparison of the tile motion vectors is performed and motion vectors determined to be outliers are discarded and not used in calculating the motion model.

10. The method of claim 1, wherein the candidate image pixel is designated to be a corner pixel only if (a) the sum of all the darker bits in the digital signature corresponding to test points on the connected circle is greater than Tdnc, or (b) the sum of all the brighter bits in the digital signature corresponding to test points on the connected circle is greater than Tbnc.

11. The method of claim 10, wherein N is greater than or equal to 4, 16 points in the census kernel are on the connected circle, and Tdnc and Tbnc are greater than 8.

12. A system for stabilizing real-time digital video received from a video source as a sequence of digital frames, each digital frame comprising an array of image pixels, each image pixel having a value, the system employing a census kernel, the census kernel being an array of points including a center point with value 0, each point having a binary value, the array having 2N+1 rows and 2N+1 columns, N being an integer greater than 1, wherein a total of T test points in the census kernel have value 1 and the other points have value 0, T being an integer greater than 8, and wherein a subset of the test points in the census kernel form a connected circle centered on the center point, the system comprising:

an input interface configured to receive the digital frames from the video source;

an output interface configured to transmit stabilized digital frames to a display device;

a computer processor electronically connected to the input interface and the output interface, the computer processor being configured to:

receive from the input interface a digital frame following a previous digital frame in the sequence of digital frames;

for each candidate image pixel in each digital frame, a candidate image pixel being any image pixel in each digital frame spaced apart by at least N pixels from an edge of the digital frame:

compute and store a digital signature of the candidate image pixel having 2T bits consisting of T brighter bits and T darker bits by aligning the center point of the census kernel with the candidate image pixel, selecting the image pixels corresponding to the test points in the census kernel, and for each selected image pixel (a) including a brighter bit of value 1 in the signature if the sum of the value of the selected image pixel and a threshold value Tb is less than the value of the candidate image pixel, or otherwise including a brighter bit of value 0 in the signature, and (b) including a darker bit of value 1 in the signature if the value of the selected image pixel is greater than the sum of the value of the candidate image pixel and a threshold value Td, or otherwise including a darker bit of value 0 in the signature;

sum all the darker bits in the digital signature corresponding to test points on the connected circle, and if the sum is greater than a threshold Tdnc, designate the candidate image pixel to be a corner pixel, or count a maximum number of darker bits having value 1 in the digital signature corresponding to contiguous test points on the connected circle, and if the number is greater than a threshold Tdc, designate the candidate image pixel to be a corner pixel;

sum all the brighter bits in the digital signature corresponding to test points on the connected circle, and if the sum is greater than a threshold Tbnc, designate the candidate image pixel to be a corner pixel, or count a maximum number of brighter bits having value 1 in the digital signature corresponding to contiguous test points on the connected circle, and if the number is greater than a threshold Tbc, designate the candidate image pixel to be a corner pixel;

for each corner pixel in the digital frame, attempt to identify an image pixel in the previous digital frame corresponding to the corner pixel based on the Hamming distances between the digital signature of the corner pixel and the stored digital signatures of the image pixels in the previous digital frame, and, if a corresponding image pixel is identified, calculating a motion vector for the corner pixel based on difference in locations of the corner pixel and the identified corresponding image pixel;

calculate a motion model based on the motion vectors;

apply the motion model to the digital frame to produce a stabilized frame; and transmit the stabilized frame to the display device via the output interface.

13. The system of claim 12, wherein each of the digital frames is received by the computer processor within 0.05 seconds after the previous digital frame was received, and each stabilized frame is produced within 0.10 seconds after the digital frame was received.

14. The system of claim 12 further comprising a display device, wherein each stabilized frame is displayed on the display device immediately after it is produced.

15. The system of claim 12, wherein for each corner pixel in one of in the digital frames having an identified corresponding image pixel in the previous digital frame, the identified corresponding image pixel is the image pixel in the previous digital frame within a pre-determined distance from the corner pixel that has the smallest Hamming distance from the corner pixel.

16. The system of claim 12, wherein each digital frame is partitioned into a plurality of non-overlapping tiles, and wherein a single tile motion vector is calculated for each tile based on the motion vectors for corner pixels in the tile, and the motion model is calculated based on the tile motion vectors.

17. The system of claim 16, wherein a statistical comparison of the tile motion vectors is performed and motion vectors determined to be outliers are discarded and not used in calculating the motion model.

18. The system of claim 16, wherein temporal filtering is performed on the tile motion vectors so that the motion model produces a smooth compensation effect over time.

19. The system of claim 12, wherein the candidate image pixel is designated to be a corner pixel only if (a) the sum of all the darker bits in the digital signature corresponding to test points on the connected circle is greater than Tdnc, or (b) the sum of all the brighter bits in the digital signature corresponding to test points on the connected circle is greater than Tbnc.

20. A method of stabilizing digital video received from a video source as a sequence of digital frames, each digital frame comprising an array of image pixels, each image pixel having a value, the method comprising the steps of:
  providing a census kernel, the census kernel being an array of points including a center point with value 0, wherein a total of T test points in the census kernel have value 1 and the other points have value 0, T being an integer greater than or equal to 8, and wherein a subset of the test points in the census kernel form a connected circle centered on the center point;
  for each candidate image pixel in each digital frame:
    computing and storing a digital signature of the candidate image pixel having 2T bits consisting of T brighter bits and T darker bits by aligning the center point of the census kernel with the candidate image pixel, selecting the image pixels corresponding to the test points in the census kernel, and for each selected image pixel (a) including a brighter bit of value 1 in the signature if the sum of the value of the selected image pixel and a threshold value Tb is less than the value of the candidate image pixel, or otherwise including a brighter bit of value 0 in the signature, and (b) including a darker bit of value 1 in the signature if the value of the selected image pixel is greater than the sum of the value of the candidate image pixel and a second threshold value, or otherwise including a darker bit of value 0 in the signature;
    designating the candidate image pixel to be a corner pixel based on analysis of the bits of value 1 in the digital signature corresponding to test points on the connected circle;
  for each digital frame following a previous digital frame in the sequence of digital frames:
    for each corner pixel in the digital frame, attempting to identify an image pixel in the previous digital frame corresponding to the corner pixel based on the Hamming distances between the digital signature of the corner pixel and the stored digital signatures of the image pixels in the previous digital frame, and, if a corresponding image pixel is identified, calculating a motion vector for the corner pixel based on difference in locations of the corner pixel and the identified corresponding image pixel;
    calculating a motion model based on the motion vectors; and
    applying the motion model to the digital frame to produce a stabilized frame.

* * * * *

UNITED STATES PATENT AND TRADEMARK OFFICE
CERTIFICATE OF CORRECTION

PATENT NO. : 10,250,809 B2
APPLICATION NO. : 15/545017
DATED : April 2, 2019
INVENTOR(S) : Piotr Kuchnio et al.

Page 1 of 1

It is certified that error appears in the above-identified patent and that said Letters Patent is hereby corrected as shown below:

On the Title Page (72) Piotr KUCHNIO, Burlington, CANADA;
Sam Anthony LEITCH, Waterdown, CANADA;
Christopher Thomas JAMIESON, Mississauga, CANADA;
"Guillaume DUMONT, Quebec, (CA);" should be --Guillaume DUMONT, Quebec City, (CA);--
"Claude CHEVALIER, Quebec, (CA);" should be --Claude CHEVALIER, Quebec City, (CA);--
"Louis ST-LAURENT, Quebec, (CA);" should be --Louis ST-LAURENT, Quebec City, (CA);--

Signed and Sealed this
Sixteenth Day of July, 2019

Andrei Iancu
*Director of the United States Patent and Trademark Office*